(12) United States Patent
Hoshing et al.

(10) Patent No.: US 11,364,832 B2
(45) Date of Patent: Jun. 21, 2022

(54) AUTOMOTIVE FLOOR CARPET SECURING SYSTEMS AND ASSOCIATED METHODS

(71) Applicant: Toyota Motor Engineering & Manufacturing North America, Inc., Plano, TX (US)

(72) Inventors: Abhijeet Anil Hoshing, Ann Arbor, MI (US); Jonathan Quijano, Ann Arbor, MI (US); James M. Thomas, Jr., Ypsilanti, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/999,102

(22) Filed: Aug. 21, 2020

(65) Prior Publication Data

US 2022/0055514 A1   Feb. 24, 2022

(51) Int. Cl.
*B60N 3/00* (2006.01)
*B60N 3/04* (2006.01)

(52) U.S. Cl.
CPC .............. *B60N 3/046* (2013.01); *B60N 3/048* (2013.01)

(58) Field of Classification Search
None
See application file for complete search history.

(56) References Cited

U.S. PATENT DOCUMENTS

2006/0099380 A1\* 5/2006 Vollmert ............... D05C 15/26
428/92

FOREIGN PATENT DOCUMENTS

| CN | 206287880 U | | 6/2017 | |
|---|---|---|---|---|
| GB | 2574788 A | \* | 12/2019 | ............ B60N 3/046 |
| JP | 2014193653 A | | 10/2014 | |
| JP | 6010448 B2 | | 10/2016 | |
| JP | 5914039 B2 | | 5/2018 | |
| KR | 0131026 B1 | | 4/1998 | |
| KR | 100552063 B1 | | 2/2006 | |

\* cited by examiner

*Primary Examiner* — Alexander S Thomas
(74) *Attorney, Agent, or Firm* — Dinsmore & Shohl LLP

(57) ABSTRACT

A vehicle floor carpet securing system includes a trim piece that includes a lateral portion connected to a vertical portion at a corner. A standoff rib anchors to a silencer layer of a vehicle carpet at an end. The standoff rib has an opposite end that engages the trim piece at the lateral portion, vertical portion and/or the corner to inhibit movement of the carpet relative to the trim piece.

11 Claims, 4 Drawing Sheets

AUTOMOTIVE FLOOR CARPET SECURING SYSTEMS AND ASSOCIATED METHODS

TECHNICAL FIELD

The present specification generally relates to carpet securing systems and, more specifically, to carpet securing systems for automobiles.

BACKGROUND

Many automobiles include carpets that are used to cover floors of the vehicles. The carpets tend to loosen and pull away from adjacent trim pieces, which can create undesirable gaps between the carpets and the trim pieces. Currently, floor carpeting for automobiles are anchored along their edges to wire harnesses. The wire harnesses include a hook member molded into the wire harnesses that receive a corresponding locking anchoring strip that interlocks with the hook member of the wire harnesses. The anchoring strip may be stapled to the carpet edges at locations where the wire harnesses are located. This current anchoring process can be costly and time-consuming and may allow anchoring of the carpet at limited locations.

Accordingly, a need exists for alternative automotive floor carpet securing systems and associated methods.

SUMMARY

In one embodiment, a vehicle floor carpet securing system includes a trim piece that includes a lateral portion connected to a vertical portion at a corner. A standoff rib anchors to a silencer layer of a vehicle carpet at an end. The standoff rib has an opposite end that engages the trim piece at the lateral portion, vertical portion and/or the corner to inhibit movement of the carpet relative to the trim piece.

In another embodiment, a vehicle includes a vehicle floor assembly including a floor underbody. A vehicle carpet covers at least a portion of the floor underbody that includes a carpet layer and a silencer layer. A floor carpet securing system includes a trim piece that includes a lateral portion connected to a vertical portion at a corner. A standoff rib is embedded in the silencer layer of the vehicle carpet at an end. The standoff rib has an opposite end that engages the trim piece at the lateral portion, vertical portion and/or the corner to inhibit movement of the carpet relative to the trim piece.

In another embodiment, a method of securing a vehicle carpet to a trim piece is provided. The method includes forming a slit in the vehicle carpet, the slit formed in both a carpet later and a silencer layer of the vehicle carpet. An end of a standoff rib is inserted into the slit and the silencer layer of the vehicle carpet. An opposite end of the standoff rib is connected to a vertical portion, a lateral portion and/or a corner of the trim piece thereby anchoring the vehicle carpet to the trim piece.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a vehicle floor carpet securing system that includes a trim piece that includes a lateral portion connected to a vertical portion at a corner. A standoff rib formed separately from the trim piece anchors to a vehicle carpet at an end. The carpet, for example, may be a multi-layer structure that includes a carpet layer and a silencer layer that coextends with the carpet layer. The end of the standoff rib may be received within a slit that is formed through both the carpet layer and the silencer layer such that the end of the standoff rib is anchored within the silencer layer of the carpet. The standoff rib has an opposite end that engages the trim piece at the lateral portion, vertical portion and/or the corner to inhibit movement of the carpet relative to the trim piece. This standoff rib engagement with the trim piece holds an edge of the carpet beneath the trim piece and inhibits movement of the edge of the carpet during operation of the vehicles.

Figure 1:
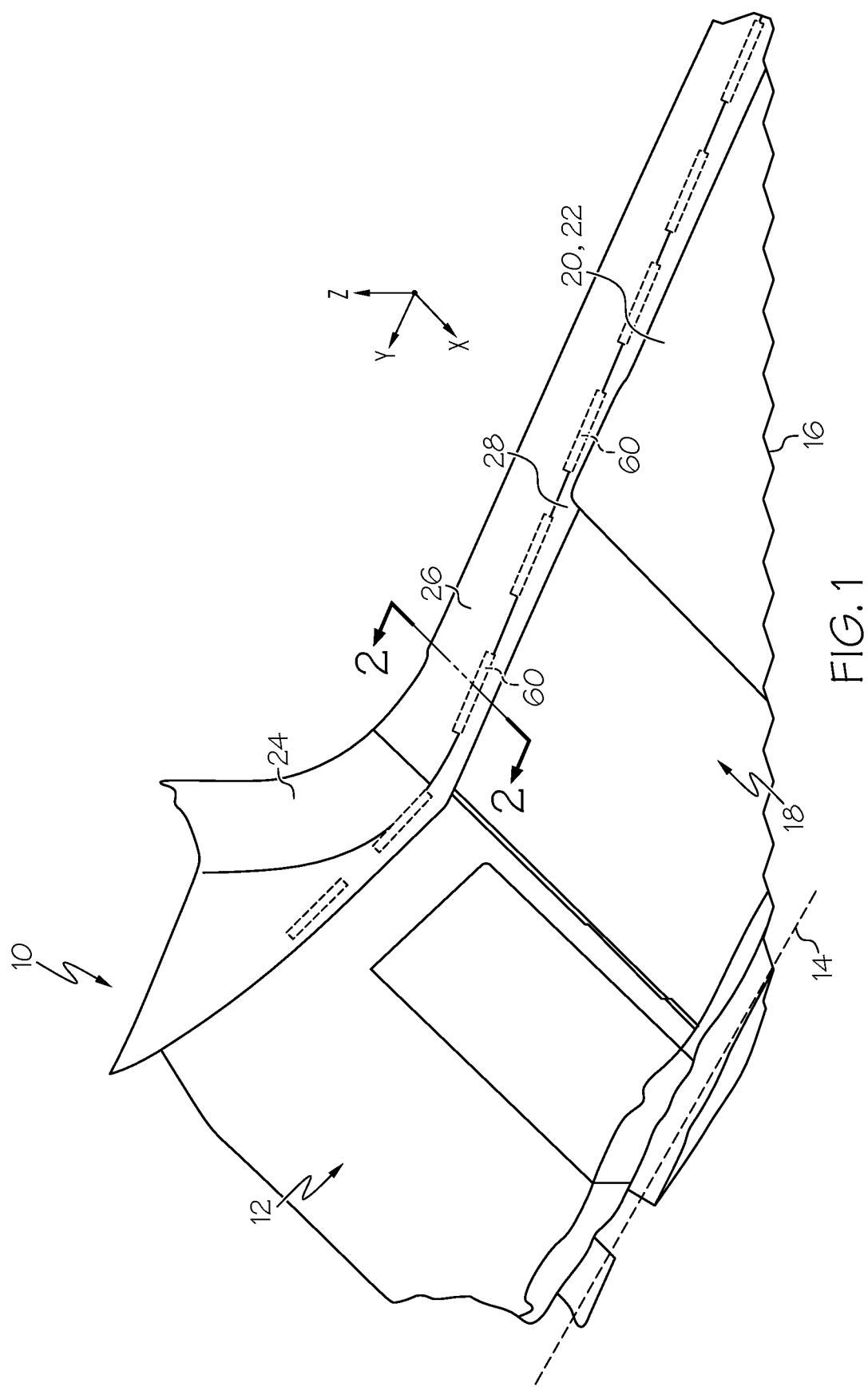
FIG. 1 depicts a portion of a floor assembly of a vehicle including a vehicle carpet securing system, according to one or more embodiments shown and described herein.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in the direction away from a vehicle centerline 14. The term "inboard" or "inward" as used herein refers to the relative location of a component in the direction opposite of "outboard" or "outward." Because the vehicle structures may be generally symmetrical about the vehicle centerline 14, the direction to which use of terms "inboard," "inward," "outboard" and "outward" refer may be mirrored about the vehicle centerline 14 when evaluating components positioned along opposite sides of the vehicle (represented by element 10).

Figure 2:
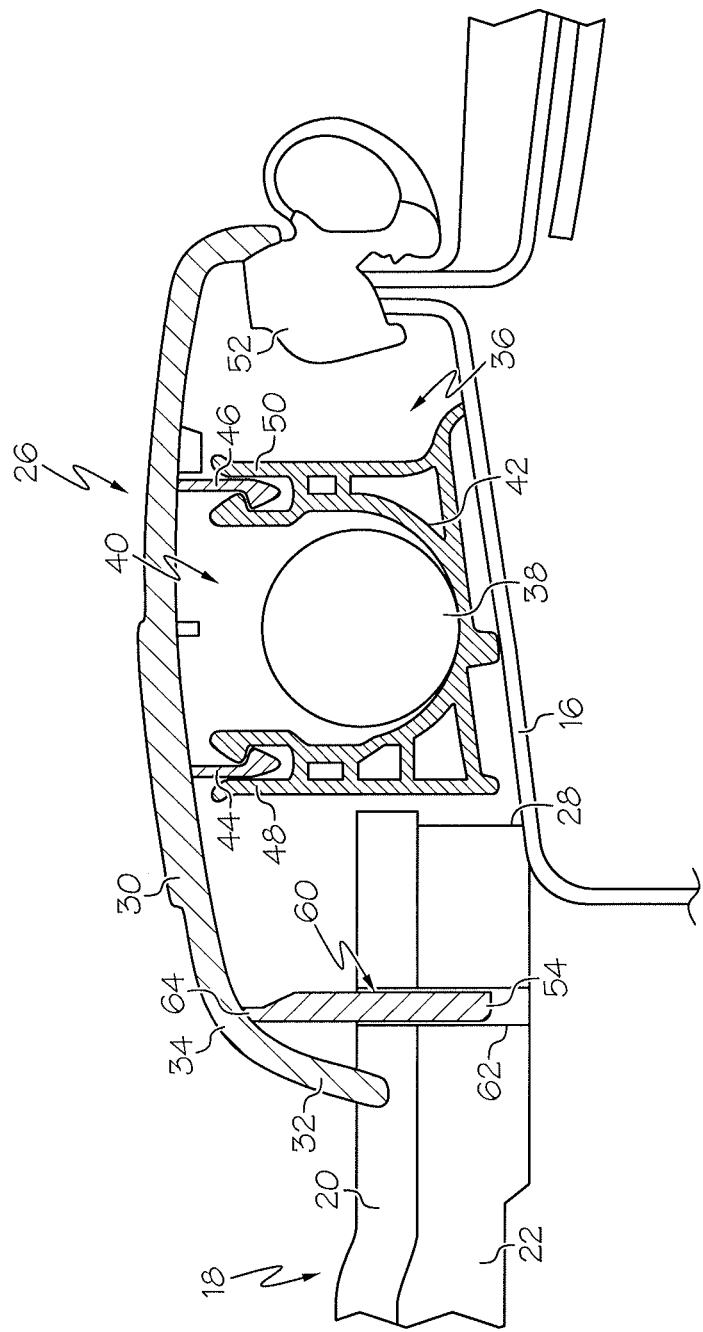
FIG. 2 depicts a section view of the vehicle carpet securing system along line 2-2 of FIG. 1, according to one or more embodiments shown and described herein.

Referring to FIG. 1, a partial perspective view of a vehicle floor assembly 12 that is part of a passenger compartment of the vehicle 10 is shown. The vehicle floor assembly 12 includes a floor underbody 16, which may be formed of a metal, such as steel and a carpet 18. The carpet 18 may be a multi-layer structure that includes an outer facing carpet layer 20 and an inner facing silencer layer 22 that faces the floor underbody 16 (FIG. 2). The carpet layer 20 and the silencer layer 22 may be formed of different materials as the carpet layer 20 and the silencer layer 22 may perform different functions. The carpet layer 20, for example, is the visible layer and directly comes into contact with passengers within the vehicle 10. The carpet layer 20 may be formed of any suitable material, such as nylon fibers. The silencer layer 22 may be hidden underneath the carpet layer 20 and come into direct contact with the floor underbody 16. The silencer layer 22 may provide added padding for the carpet 18 and also provide a sound buffer between the carpet layer 20 and the floor underbody 16. The silencer layer 22 may be formed of any suitable material such as urethane and synthetic fibers. In some embodiments, the structure of the silencer layer 22 may be more dense than that of the carpet layer. Further, a thickness of the silencer layer 22 may be greater than a thickness of the carpet layer 20.

The vehicle floor assembly 12 further includes a number of floor trim pieces (trim pieces 24 and 26 are illustrated in FIG. 1). Trim piece 24 may be, for example, a cowl side trim piece and trim piece 26 may be a front scuff plate. As used herein, the terms "floor trim piece" and "trim piece" refer to any covering, typically a molded plastic, that is used to cover a portion, such as an edge, of the carpet 18.

Located under the trim pieces 24 and 26 are standoff ribs 60 that are represented by dashed lines. As will be described in greater detail below, the standoff ribs 60 are anchored into the carpet 18 at one end and touch off to the trim pieces 24 and 26 at an opposite end to hold a longitudinally and/or laterally extending edge 28 of the carpet 18 beneath the trim pieces 24 and 26 and to also inhibit both vertical and lateral movement of the edge of the carpet 18 relative to the trim pieces 24 and 26.

Referring to FIG. 2, The trim piece 26 may provide a front scuff plate at a side of the vehicle 10 and include a lateral portion 30 that extends laterally in a widthwise direction and longitudinally in a lengthwise direction and a vertical portion 32 that extends generally vertically and also longitudinally in the lengthwise direction. The lateral portion 30 and the vertical portion 32 may meet at a corner 34, which is a transition between the lateral and vertical portions 30 and 32. The corner 34 may have any radius of curvature that transitions between surfaces that extend at different angles and may depend on the location and styling of a particular vehicle. For example, a cowl side trim piece may have a different shape and dimensions than the front scuff plate trim piece.

In some embodiments, a cable harness assembly 36 may be located underneath and hidden from view by the trim piece 26. The cable harness assembly 36 may include a cable harness 38 that is received within a channel 40 of a wire harness support 42. The trim piece 26 may include connectors 44 and 46, such as snap-like connectors that connect to mating connectors 48 and 50 of the wire harness support 42. The wire harness support 42 may be shaped and sized to run along the floor underbody 16 in the vehicle longitudinal direction. In some embodiments, the wire harness support and the trim piece may run in the vehicle lateral direction. A seal 52 may be provided between the trim piece 26 and the floor underbody 16 along an outer edge of the trim piece 26.

The carpet 18 is illustrated passing under the vertical portion 32, terminating at the edge 28 that extends longitudinally along with the trim piece 26. The edge 28 of the carpet 18 may be located spaced laterally from the wire harness support 42. In some embodiments, the edge 28 may abut the wire harness support 42. As can be seen, the carpet 18 includes the carpet layer 20 and the silencer layer 22.

The silencer layer 22 is of sufficient thickness to receive an end 54 of a standoff rib 60. The standoff rib 60 may be formed separately from the trim piece 26. The end 54 of the standoff rib 60 may be received within a slit (represented by element 62) that is formed through both the carpet layer 20 and the silencer layer 22 such that the end 54 of the standoff rib 60 is anchored within the silencer layer 22 of the carpet 18. The standoff rib 60 has an opposite end 64 that engages the trim piece 26 at the lateral portion 30, vertical portion 32 and/or the corner 34 to inhibit movement of the carpet 18 relative to the trim piece 26.

In some embodiments, the standoff rib 60 may be formed separately from the trim piece 26, anchored into the silencer layer 22 of the carpet 18 and located to engage the trim piece 26 as shown by FIG. 2. In some embodiments, the standoff rib 60 may be formed separately from the trim piece 26 and then connected thereto using any suitable method, such as an adhesive, welding and/or fastener. In some embodiments, the standoff rib 60 may be formed as a monolithic part of the trim piece 26 and be anchored into the silencer layer 22. The standoff rib 60 is of sufficient length to be engaged with the desired area of the trim piece 26 at the end 64 and to extend through the carpet layer 20 and into the silencer layer 22. While the standoff rib 60 is illustrated as extending only partially through the silencer layer 22, the standoff rib 60 may extend completely through the silencer layer 22.

Figure 3:
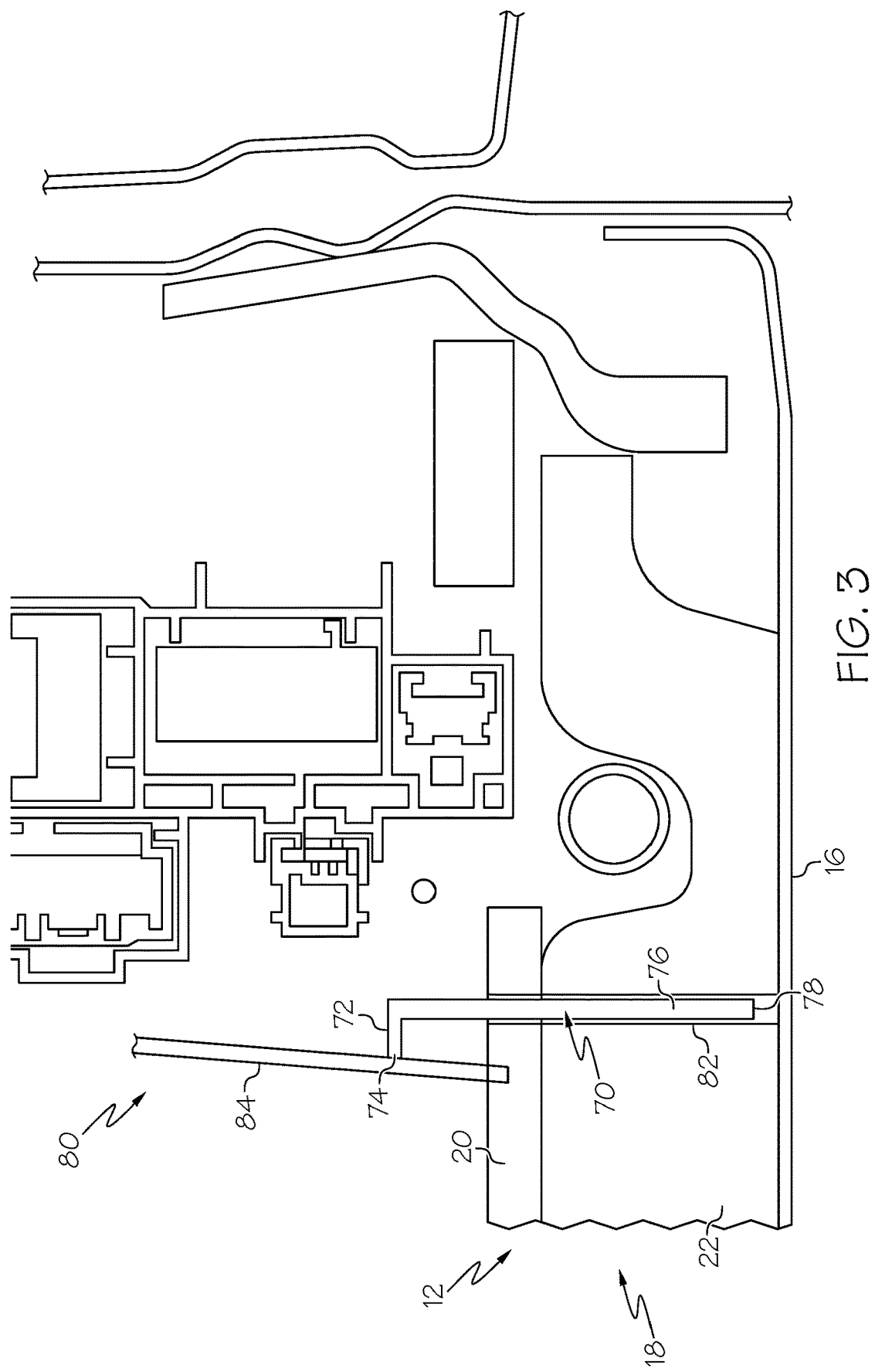
FIG. 3 depicts another section view of the vehicle carpet securing system of FIG. 1, according to one or more embodiments shown and described herein.

Referring to FIG. 3, another embodiment of a standoff rib 70 is illustrated that includes a lateral portion 72 that extends to an end 74 and a vertical portion 76 that extends to an end 78. The standoff rib 70 may be used to anchor the edge of the carpet 18 to a different trim piece 80 at a different location on the vehicle floor assembly 12. As above, the vertical portion 76 extends into a slit 82 that is formed through both the carpet layer 20 and the silencer layer 22 such that the end 78 of the standoff rib 70 is anchored within the silencer layer 22 of the carpet 18. In this embodiment, the slit 82 runs to the floor underbody 16. The standoff rib 70 has the opposite end 74 that engages the trim piece 80 at vertical portion 84 to inhibit movement of the carpet 18 relative to the trim piece 80. As can be seen by FIG. 3 (and FIG. 2), the vertical portion 84 of the trim piece 80 may also engage the carpet layer 20 to provide a gapless transition from the carpet 18 to the vertical portion 84.

Figure 4:
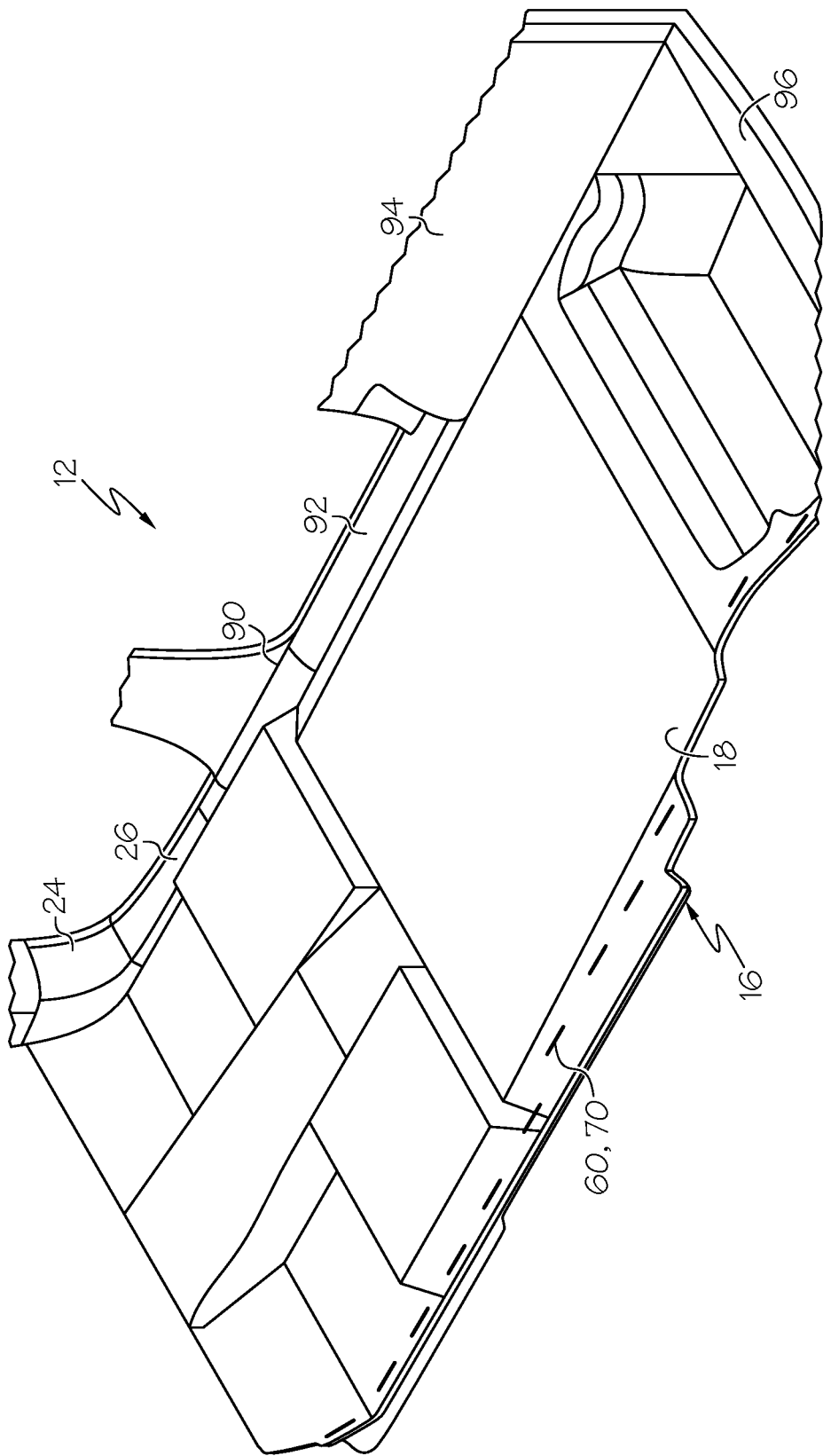
FIG. 4 depicts a perspective view of the floor assembly of FIG. 1 including the vehicle carpet securing system, according to one or more embodiments shown and described herein.

Referring now to FIG. 4, the vehicle floor assembly 12 may include any number of trim pieces 24 and 26 at any suitable location around a perimeter of the floor underbody 16. As examples, trim piece 90 may be a B-pillar trim, trim piece 92 may be a middle scuff plate and trim piece 94 a quarter side trim. Trim piece 96 located at a rear of the vehicle 10 may be a rear scuff plate. Elements 60, 70 represent the standoff ribs, which may be any suitable shape in order to anchor to the silencer layer of the carpet 18 and touch off to the trim piece.

The above-described vehicle floor carpet securing systems include standoff ribs that are anchored into a silencer layer of a carpet. The standoff ribs may extend along longitudinal and/or lateral edges of the carpet in order to anchor the carpet to trim pieces that are arranged along edges of a vehicle floor assembly. The standoff ribs can be formed to be anchored within slits that are formed into the silencer layer of the carpet. The standoff ribs touch off to an area of the trim pieces to inhibit one or both of lateral and vertical movement of the vehicle carpets. Inhibiting movement of the vehicle carpet can reduce unsightly gaps between the edges of the vehicle carpet and the trim pieces, reduce bunching of the carpet on the floor and reduce noise due to vibration of the carpet.

It is noted that the terms "substantially" and/or "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle floor carpet securing system comprising:
   a trim piece that includes a lateral portion connected to a vertical portion at a corner, the trim piece covers a wire harness support; and
   a standoff rib that anchors to a silencer layer of a vehicle carpet at an end, the standoff rib having an opposite end that engages the trim piece at one or more of the lateral portion, the vertical portion, and the corner to inhibit movement of the carpet relative to the trim piece, the standoff rib being spaced laterally from the wire harness support,
   wherein the opposite end of the standoff rib engages the trim piece at the vertical portion, and
   wherein the standoff rib comprises a vertical portion and a lateral portion, the lateral portion of the standoff rib having the opposite end that engages the vertical portion of the trim piece.

2. The vehicle floor carpet securing system of claim 1, wherein the standoff rib is formed separately from the trim piece.

3. The vehicle floor carpet securing system of claim 1, wherein the opposite end of the standoff rib engages the trim piece at the corner.

4. The vehicle floor carpet securing system of claim 1 further comprising a vehicle carpet comprising a carpet layer and a silencer layer, the end of the standoff rib anchored in the silencer layer.

5. A vehicle comprising a vehicle floor assembly, comprising:
   a floor underbody;
   a vehicle carpet covering at least a portion of the floor underbody comprising a carpet layer and a silencer layer; and
   a floor carpet securing system comprising:
      a trim piece that includes a lateral portion connected to a vertical portion at a corner, the trim piece convers a wire harness support; and
      a standoff rib embedded in the silencer layer of the vehicle carpet at an end, the standoff rib having an opposite end that engages the trim piece at one or more of the lateral portion, the vertical portion, and the corner to inhibit movement of the carpet relative to the trim piece, the standoff rib being spaced laterally from the wire harness support,
   wherein the opposite end of the standoff rib engages the trim piece at the vertical portion, and
   wherein the standoff rib comprises a vertical portion and a lateral portion, the lateral portion of the standoff rib having the opposite end that engages the vertical portion of the trim piece.

6. The vehicle of claim 5, wherein the standoff rib is formed separately from the trim piece.

7. The vehicle of claim 5, wherein the opposite end of the standoff rib engages the trim piece at the corner.

8. The vehicle of claim 5, wherein the standoff rib is formed as a monolithic part of the trim piece.

9. The vehicle of claim 5, wherein the lateral portion of the standoff rib extends perpendicular from the vertical portion of the standoff rib.

10. The vehicle floor carpet securing system of claim 1, wherein the standoff rib is formed as a monolithic part of the trim piece.

11. The vehicle floor carpet securing system of claim 1, wherein the lateral portion of the standoff rib extends perpendicular from the vertical portion of the standoff rib.

* * * * *